United States Patent [19]
Sawada et al.

[11] 3,804,444
[45] Apr. 16, 1974

[54] BUMPER SPRING SUPPORT ASSEMBLY

[75] Inventors: Tsutomu Sawada, Hiratsuka;
Masaaki Oguma, Tokyo, both of Japan

[73] Assignee: Nissan Motor Company, Limited, Yokohama, Japan

[22] Filed: July 11, 1972

[21] Appl. No.: 270,825

[30] Foreign Application Priority Data
Aug. 7, 1971   Japan........................... 46-70144[U]

[52] U.S. Cl.................................... 293/87, 293/91
[51] Int. Cl.... B60r 19/06, G60r 21/14, B61f 19/04
[58] Field of Search.............. 293/60, 91, 92, 93, 87

[56] References Cited
UNITED STATES PATENTS
| | | | |
|---|---|---|---|
| 1,539,176 | 5/1925 | Fry | 293/91 |
| 1,717,896 | 6/1929 | Starck | 293/91 |
| 1,732,166 | 10/1929 | Nilsson | 293/91 |
| 1,533,517 | 4/1925 | Sager | 293/91 X |

FOREIGN PATENTS OR APPLICATIONS
266,198   2/1927   Great Britain........................ 293/91

*Primary Examiner*—Robert G. Sheridan
*Assistant Examiner*—Howard Beltran

[57] ABSTRACT

An impact absorbing bumper support adapted for supporting a bumper of an automotive vehicle, which bumper support has a rearward end portion secured to the frame structure of the vehicle body and a forward end portion secured to the bumper. The bumper stay also has a U-shaped portion which is elastically deformable for absorbing the energy of an impact force resulting from a collision encountered by the automotive vehicle for thereby satisfactorily alleviating the magnitude of the impact force exerted on a vehicle occupant and the vehicle body.

1 Claim, 5 Drawing Figures

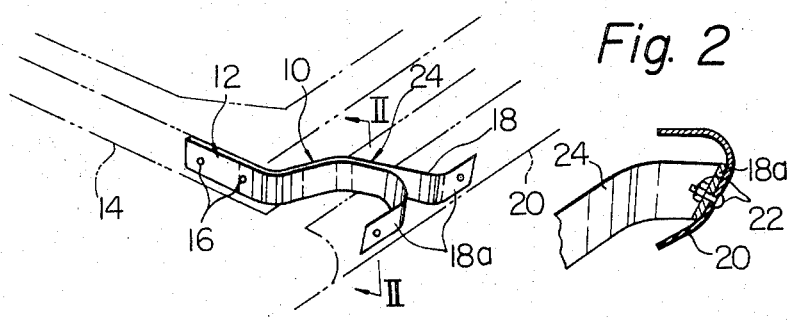
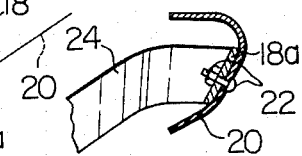
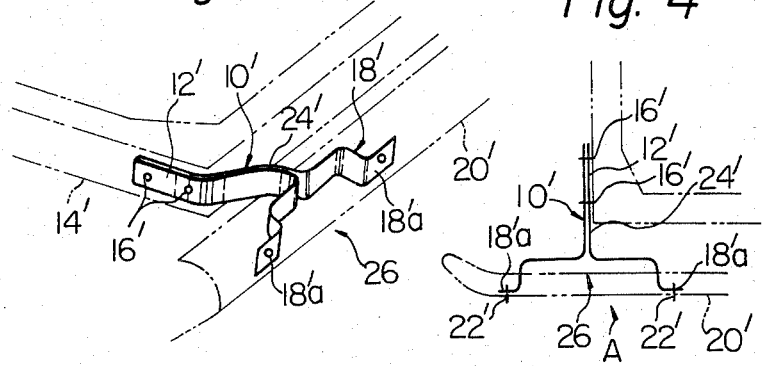
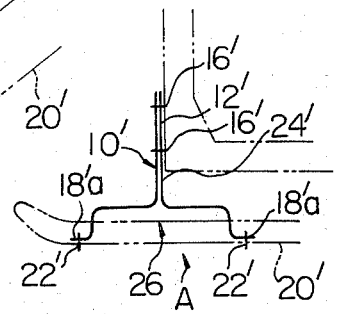
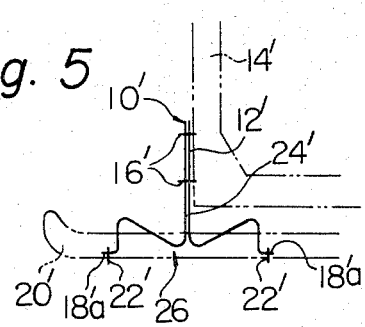

BUMPER SPRING SUPPORT ASSEMBLY

This invention relates to an impact absorbing bumper support for use in an automotive vehicle and, more particularly, to an impact absorbing bumper support which is so constructed as to be deformable when subjected to a mechanical pressure or impact resulting from a collision. The impact absorbing bumper support proposed by the present invention is specifically suited for use with a bumper of an automotive vehicle whereby a mechanical impact resulting from a collision encountered by the automotive vehicle is mitigated to protect vehicle occupants from serious injury.

It is a principal object of the present invention to provide an impact absorbing bumper support for use with a bumper of an automotive vehicle which bumper support is capable of satisfactorily absorbing energy of an impact resulting from a collision encountered by the automotive vehicle for thereby protecting vehicle occupants from being seriously injured.

It is another object of the present invention to provide an improved impact absorbing bumper support for use with a bumper of an automotive vehicle which bumper support is capable of alleviating the energy of the impact force to be transmitted to the vehicle body when the automotive vehicle encounters a collision.

It is another object of the present invention to provide an impact absorbing bumper support being small-sized and compactly constructed to be readily installed in a limited working space.

These and other features and advantages of the present invention will become more apparent from the following description when taken in conjunction with the accompanying drawings, in which:

FIG. 1 is a schematic perspective view of a conventional bumper support for use with a bumper of an automotive vehicle;

FIG. 2 is a sectional view of the bumper support taken on line 2—2 of FIG. 1;

FIG. 3 is a schematic perspective view of an impact absorbing bumper support according to the present invention;

FIG. 4 is a plan view of the impact absorbing bumper support of FIG. 3; and

FIG. 5 is a view illustrating an operating condition of the impact absorbing bumber support according to the present invention.

As is well known, a prior art bumper support for supporting a bumper of an automotive vehicle is so constructed as to provide a rigid structure whereby an impact force resulting from a collision encountered by the automotive vehicle is dissipated to a very large extent to the vehicle body. An example of such prior art bumper support is clearly illustrated in FIGS. 1 and 2. As shown, the prior art bumper support, which is generally designated by reference numeral 10, has a rearward end portion 12 which is fastened to a frame member 14 of the vehicle body by means of bolts 16, and a forward end portion 18 having laterally outwardly extending flanges 18a. The flanges 18a of the forward end portion 18 are secured to a bumper 20 by means of a bolt and a nut 22. As seen in FIG. 1, this prior art bumper support 10 has an intermediate portion 24 which is generally straight so that the bumper support 10 is rigid in construction. With this construction, the bumper support 10 is not deformed when an impact force resulting from a collision of the automotive vehicle is exerted on the bumper 20. Consequently, the impact force exerted on the bumper 20 is directly transmitted through the bumper stay 10 and frame member 14 to seats of the passenger compartment (not shown). Thus, the magnitude of deceleration to be exerted on the vehicle body and the vehicle passenger occupying the seat is not decreased so that the vehicle occupant is not satisfactorily prevented from being injured.

The present invention contemplates to provide an impact absorptive bumper support which is so constructed as to be elastically deformed when subjected to the impact force encountered by the automotive vehicle for thereby alleviating the energy of the impact force exerted on the vehicle body and the vehicle occupant whereby the vehicle occupant is satisfactorily prevented from being seriously injured.

A preferred example of the impact absorbing bumper support implementing the present invention is clearly shown in FIGS. 3, 4 and 5, wherein like components parts are designated by same reference numerals as those used in FIGS. 1 and 2 except that a prime (') has been added thereto, respectively. As shown, the impact absorptive bumper support 10' includes a rearward end portion 12' which is secured to a frame member 14' of the vehicle body by means of bolts 16', a forward end portion 18' having laterally outwardly extending flanges 18'a securing a bumper 20' by means of bolt and nut 22', and an intermediate portion 24'. According to an important feature of the present invention, a U-shaped portion 26 adapted to be elastically deformable is provided between the flanges 18'a of the forward end portion 18' and the rearward end portion 12'. While, in the illustrated embodiment, the impact absorbing bumper support is shown as having only one U-shaped portion, it may be appreciated that the impact absorbing bumper support may be provided with more than one U-shaped portion, if desired.

When, now, the bumper 20' is subjected to an impact force in the direction as shown by an arrow A in FIG. 4, the impact force exerted on the bumper 20' is transmitted to the bumper stay 10'. At this instant, the bumper stay 10' is elastically deformed at its U-shaped portion 26 as shown in FIG. 5, thus satisfactorily absorbing the energy of the impact force exerted on the vehicle body and the vehicle occupant thereby preventing the vehicle occupant from suffering serious injuries.

It will now be understood that the impact absorptive bumper stay of the present invention is capable of preventing the vehicle passenger from suffering serious injuries in a satisfactory fashion with the provision of simple means.

What is claimed is:

1. An impact absorptive bumper support for supporting a bumper of an automotive vehicle having a frame structure, comprising a pair of plate members secured to each other about a longitudinal axis of symmetry and having rearward end portions connectable to said frame structure, forward end portions each provided with laterally outwardly extending flanges securable to said bumper for supporting the same, and a U-shaped portion formed about said axis by said pair of plate members between said rearward end portion and said forward end portion, said U-shaped portion being elastically deformable when subjected to an impact force for thereby alleviating the energy of said impact force otherwise transmitted to the vehicle body.

* * * * *